(12) United States Patent
Short et al.

(10) Patent No.: US 11,013,365 B2
(45) Date of Patent: May 25, 2021

(54) CLEANING ARRANGEMENT FOR CAPSULE BASED BEVERAGE DISPENSERS

(71) Applicant: Cafetto Asia Pte. Ltd., Singapore (SG)

(72) Inventors: Christopher Short, Brompton (AU); Andrew William Whittaker, Henley Beach (AU)

(73) Assignee: Cafetto Asia Pte. Ltd., Singapore (SG)

( * ) Notice: Subject to any disclaimer, the term of this patent is extended or adjusted under 35 U.S.C. 154(b) by 295 days.

(21) Appl. No.: 15/773,229

(22) PCT Filed: Nov. 7, 2016

(86) PCT No.: PCT/IB2016/056668
§ 371 (c)(1),
(2) Date: May 3, 2018

(87) PCT Pub. No.: WO2017/077510
PCT Pub. Date: May 11, 2017

(65) Prior Publication Data
US 2018/0325309 A1    Nov. 15, 2018

(30) Foreign Application Priority Data

Nov. 6, 2015  (AU) ................................ 2015904566

(51) Int. Cl.
*A47J 31/60*  (2006.01)
*A47J 31/36*  (2006.01)
(Continued)

(52) U.S. Cl.
CPC ........... *A47J 31/60* (2013.01); *A47J 31/3623* (2013.01); *A47J 31/3633* (2013.01);
(Continued)

(58) Field of Classification Search
CPC .... A47J 31/60; A47J 31/3623; A47J 31/3695; A47J 31/3633; B65D 85/804; B65D 85/8043
See application file for complete search history.

(56) References Cited

U.S. PATENT DOCUMENTS

| | | | |
|---|---|---|---|
| 2015/0090300 A1* | 4/2015 | Dyer | C11D 17/041 |
| | | | 134/22.18 |
| 2015/0141313 A1 | 5/2015 | Aregger et al. | |

(Continued)

FOREIGN PATENT DOCUMENTS

| | | |
|---|---|---|
| EP | 2604547 A1 | 6/2013 |
| EP | 2650234 A1 | 10/2013 |

(Continued)

*Primary Examiner* — Bayan Salone
(74) *Attorney, Agent, or Firm* — The Webb Law Firm

(57) ABSTRACT

A cleaning device for cleaning a capsule based beverage system is described. The cleaning device includes a body portion having an open end and configured to be located in the brewing chamber of the beverage system and a reservoir portion located at an opposed end to the open end of the body portion as well as a fluid jet forming portion in fluid communication with reservoir region. The cleaning device also includes a cleaning material holding portion located internally of the body portion for holding the cleaning material spaced apart from the fluid jet forming portion. The cleaning device is configured to allow water under pressure originating from the inlet arrangement of the beverage system to flow into the reservoir portion and to form a fluid jet from the fluid jet forming portion that impinges on cleaning material held in the cleaning material holding portion to create a cleaning solution to clean the brewing chamber and outlet arrangement of the beverage system.

16 Claims, 7 Drawing Sheets

(51) Int. Cl.
*B65D 85/80* (2006.01)
*B65D 85/804* (2006.01)

(52) U.S. Cl.
CPC ........ *A47J 31/3695* (2013.01); *B65D 85/804* (2013.01); *B65D 85/8043* (2013.01)

(56) References Cited

U.S. PATENT DOCUMENTS

| | | | |
|---|---|---|---|
| 2015/0150412 A1* | 6/2015 | Heitele | B65D 75/04 134/22.1 |
| 2015/0239655 A1 | 8/2015 | Schroeder et al. | |
| 2016/0022088 A1 | 1/2016 | Dick | |
| 2018/0220840 A1* | 8/2018 | Vorfeld | B65D 65/46 |

FOREIGN PATENT DOCUMENTS

| | | | | |
|---|---|---|---|---|
| WO | 2013188246 A2 | 12/2013 | | |
| WO | WO-2013188246 A2 * | 12/2013 | ............. | A47J 31/60 |
| WO | 2015144347 A1 | 10/2015 | | |
| WO | 2015170174 A1 | 11/2015 | | |
| WO | WO-2015170174 A1 * | 11/2015 | ......... | B65D 85/8043 |

* cited by examiner

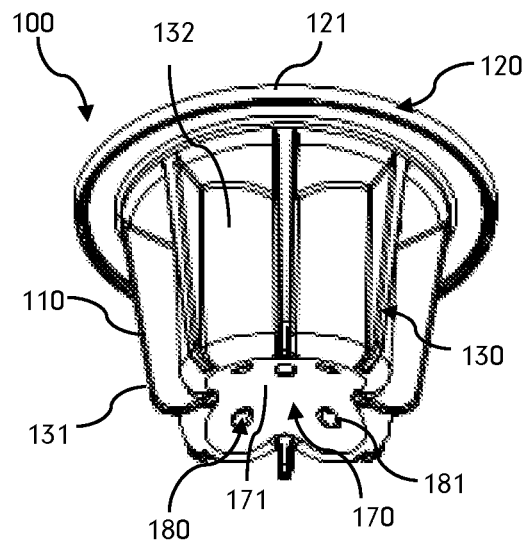
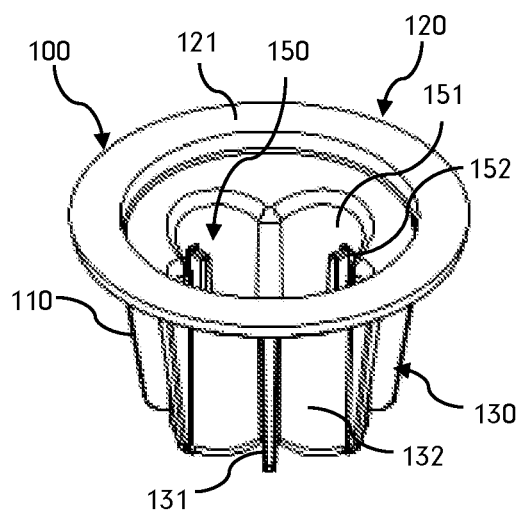
Figure 1a
Figure 1b
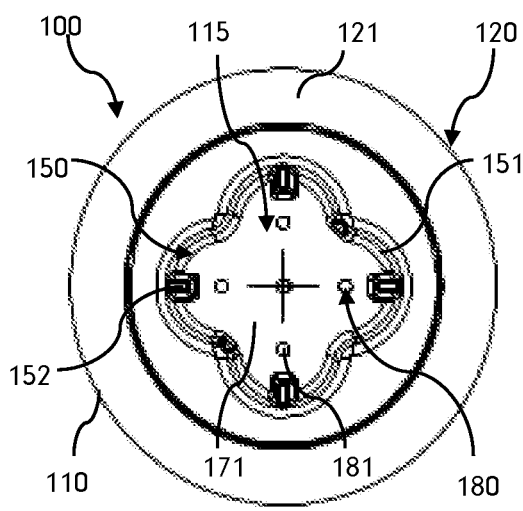
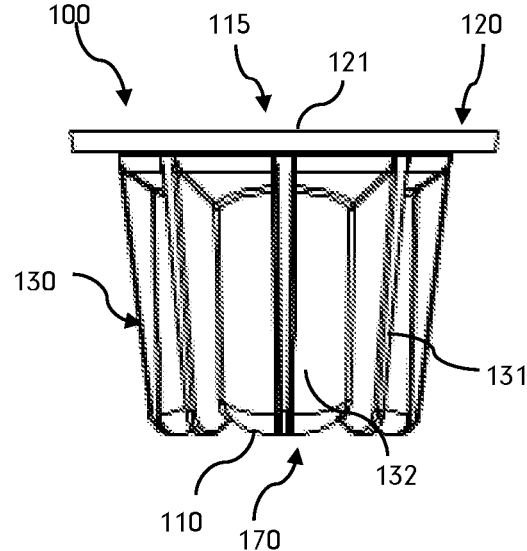
Figure 1c
Figure 1d

CLEANING ARRANGEMENT FOR CAPSULE BASED BEVERAGE DISPENSERS

CROSS-REFERENCE TO RELATED APPLICATIONS

This application is the United States national phase of International Application No. PCT/IB2016/056668 filed Nov. 7, 2016, and claims priority to Australian Provisional Patent Application No. 2015904566 titled "CLEANING ARRANGEMENT FOR CAPSULE BASED BEVERAGE DISPENSERS" filed Nov. 6, 2015, the disclosures of which are hereby incorporated in their entirety by reference.

INCORPORATION BY REFERENCE

The following co-pending patent application is referred to in the following description:
PCT/IB2015/000878 titled "CLEANING DEVICE AND METHOD" and filed on 5 May 2015 claiming priority from Australian Provisional Patent Application Nos. 2014903817 and 2014901640.
The content of this application is incorporated by reference in its entirety.

TECHNICAL FIELD

The present disclosure relates to the cleaning of beverage dispensing equipment. In a particular form, the present disclosure relates to the cleaning of automated capsule based beverage equipment.

BACKGROUND

In the co-pending patent application PCT/IB2015/000878 titled "CLEANING DEVICE AND METHOD" the Applicant has described a cleaning device for a capsule based beverage system comprising an open ended body that included a cleaning material holding portion where the cleaning material holding portion is configured to hold the cleaning material in a fixed relationship with respect to the body portion and where the body portion is configured to allow water under pressure originating from the inlet arrangement to flow through the body portion and to interact with the cleaning material to create a cleaning solution to clean the brewing chamber and outlet arrangement.

While this arrangement has worked more than satisfactorily, the Applicant has developed new enhancements which further improve the cleaning capability of the cleaning device or at least provide an alternative arrangement.

SUMMARY

In a first aspect, the present disclosure provides a cleaning device for cleaning a capsule based beverage system, the capsule based beverage system including a brewing chamber having a predetermined size and shape for receiving a beverage capsule, the brewing chamber including an inlet arrangement operable to introduce water at pressure into the beverage capsule received in the chamber and an outlet arrangement to deliver beverage from the beverage capsule, the cleaning device comprising:
a body portion having an open end and configured to be located in the brewing chamber;
a reservoir portion located at an opposed end to the open end of the body portion;
a fluid jet forming portion in fluid communication with reservoir region; and
a cleaning material holding portion located internally of the body portion for holding the cleaning material spaced apart from the fluid jet forming portion, wherein the cleaning device is configured to allow water under pressure originating from the inlet arrangement to flow into the reservoir portion and to form a fluid jet from the fluid jet forming portion that impinges on cleaning material held in the cleaning material holding portion to create a cleaning solution to clean the brewing chamber and outlet arrangement.

In another form, the reservoir portion is formed by a depressed wall portion located at the opposed end to the open end of the body portion.

In another form, the fluid jet forming portion is formed in the depressed wall portion of the reservoir portion.

In another form, the fluid jet forming portion includes one or more orifices formed in the depressed wall portion, the orifices configured to form a fluid jet from water originating in the reservoir portion.

In another form, the body portion includes an insert portion and a locating portion, the insert portion extending into the brewing chamber and the locating portion configured to engage with the brewing chamber to prevent movement of the body portion when water under pressure interacts with the cleaning material.

In another form, the insert portion generally conforms to or with the shape of the brewing chamber.

In another form, the cleaning material holding portion is configured to allow reloading of the cleaning material holding portion after use.

In another form, the cleaning material holding portion is a tablet holding region adapted to receive the cleaning material in tablet form.

In another form, the tablet holding region is configured to hold the tablet by press fitting the tablet into the tablet holding region.

In another form, the cleaning material holding portion is a capsule holding region adapted to receive the cleaning material in capsule form.

In another form, the capsule holding region is configured to hold the capsule by press fitting the capsule into the capsule holding region.

In another form, the body portion and the cleaning material holding portion are integrally formed in a unitary moulding.

In a second aspect, the present disclosure accordingly provides a method for cleaning a capsule based beverage system, the capsule based beverage system including a brewing chamber having a predetermined size and shape for receiving a beverage capsule, the brewing chamber including an inlet arrangement operable to introduce water at pressure into the beverage capsule received in the chamber and an outlet arrangement to deliver beverage from the beverage capsule, the method including:
inserting a cleaning device configured to be received into the brewing chamber, the cleaning device comprising an open-ended body that holds the cleaning material spaced apart from a fluid jet forming region of the cleaning device;
operating the beverage system to cause water at pressure to enter the brewing chamber by the inlet arrangement to form one or more fluid jets from the fluid jet forming region to impinge on the cleaning material to form a cleaning solution; and
operating the beverage system to cause the cleaning solution to be forced out of the outlet arrangement.

In another form, the cleaning device is reusable and further including reloading cleaning material into the cleaning device before inserting the cleaning device into the brewing chamber.

In another form, the cleaning material is in tablet form and reloading includes press fitting the tablet into a tablet holding region of the cleaning device.

In another form, the method further includes flushing the beverage system by operating the beverage system again following the initial operating of the beverage system to cause the cleaning solution to be forced out of the outlet arrangement prior to preparing a beverage.

BRIEF DESCRIPTION OF DRAWINGS

Embodiments of the present disclosure will be discussed with reference to the accompanying drawings where:

FIGS. 1a to 1f are various views of a cleaning device for a Nespresso™ capsule based beverage system in accordance with an illustrative embodiment;

In the following description, like reference characters designate like or corresponding parts throughout the figures.

DESCRIPTION OF EMBODIMENTS

Figure 1E:
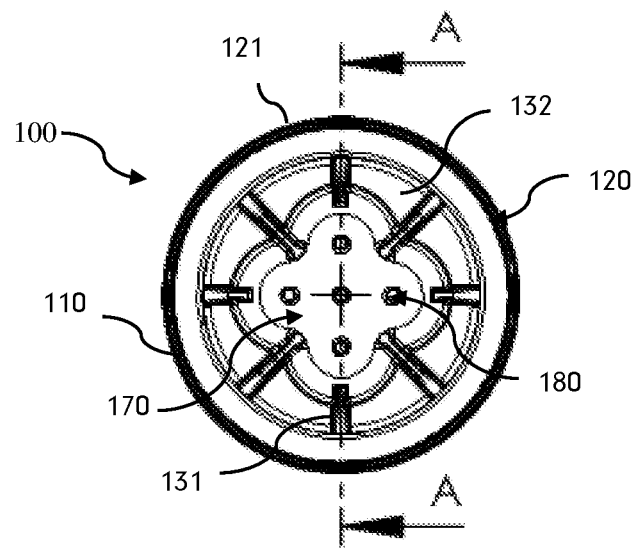
Figure 1F:
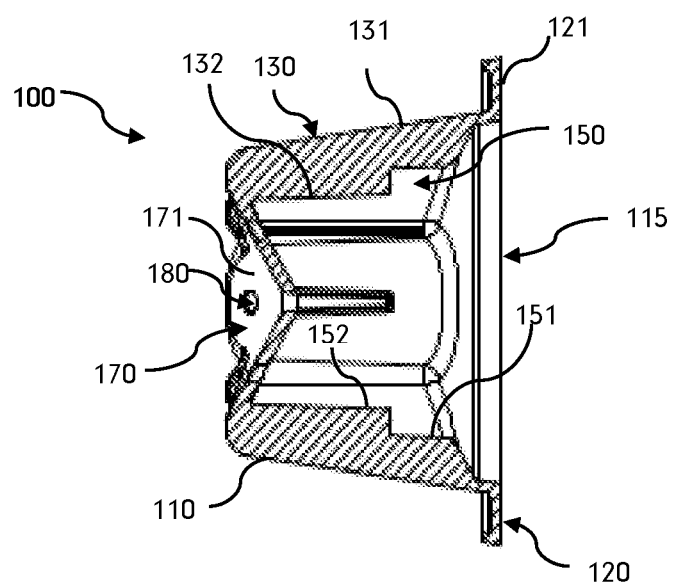

Referring now to FIGS. 1a to 1f, there are shown various views of a cleaning device 100 for cleaning a capsule based beverage system in accordance with an illustrative embodiment.

In this illustrative embodiment, cleaning device 100 is configured to clean the brewing chamber and outlet arrangement of Nespresso™, DeLonghi™ and Breville™ capsule or pod systems, including but not limited to, Pixie, Lattissima, Essenza, Maestria, CitiZ and Le Cube machines. Cleaning device 100 includes a body portion 110 having an open end 115 that is configured to be located in the brewing chamber in the same sense as a beverage capsule locates in the brewing chamber for making a beverage.

Cleaning device 100 further includes a reservoir portion 170 that is located at an opposed end to the open end 115 of body portion 110 and a fluid jet forming portion 180 in fluid communication with the reservoir portion 170 in addition to a cleaning material holding portion 150 that is located internally of the body portion 110.

Body portion 110 includes a locating portion 120 to engage with the brewing chamber of the beverage system to prevent movement of the body portion 110 during the cleaning process. In this embodiment, locating portion 120 is formed as circular rim or lip 121 that seats or locates against the opening of the brewing chamber in a similar manner as the rim of the corresponding beverage capsule.

Body portion 110 further includes an insert portion 130 that extends into and generally conforms to the shape of the brewing chamber. In this illustrative embodiment, insert portion 130 is cup shaped and includes a number of longitudinally extending equally spaced external ribs 131 surrounding a tapered generally cylindrical wall portion 132 that in use extends into the brewing chamber from the lip 121 of body portion 110 and terminates in the reservoir portion 170 which is formed as an inwardly shaped depression or dimple in the end of insert portion 130 forming a depressed or indented wall portion 171.

Figure 4:
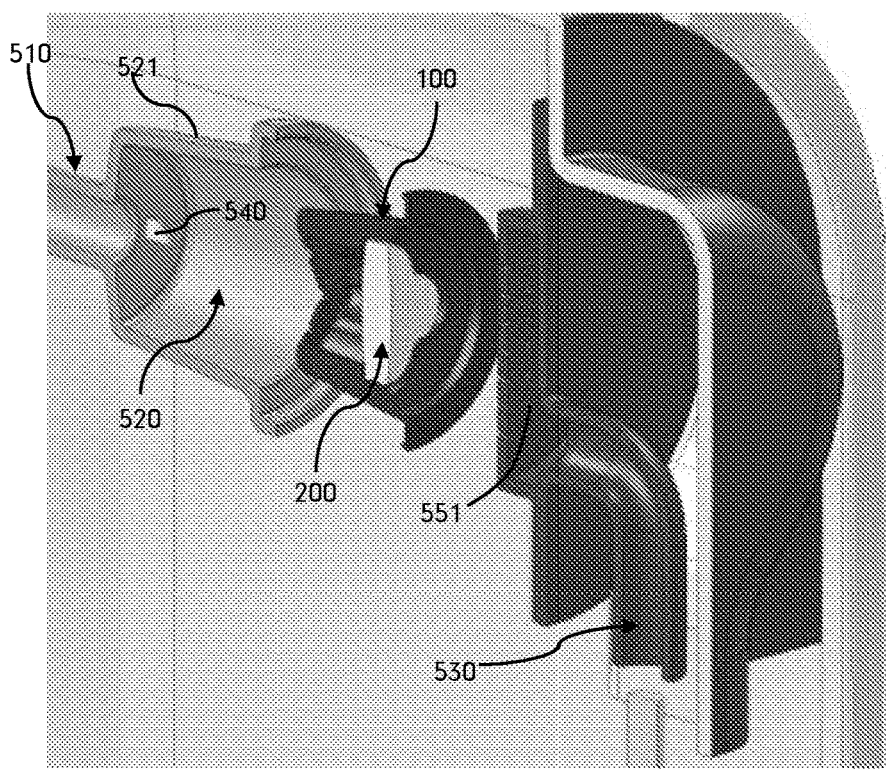
FIG. 4 is a figurative sectional view of the Nespresso™ capsule based beverage system illustrated in FIG. 2 being loaded with the cleaning device illustrated in FIGS. 1a to 1f.
Figure 5:
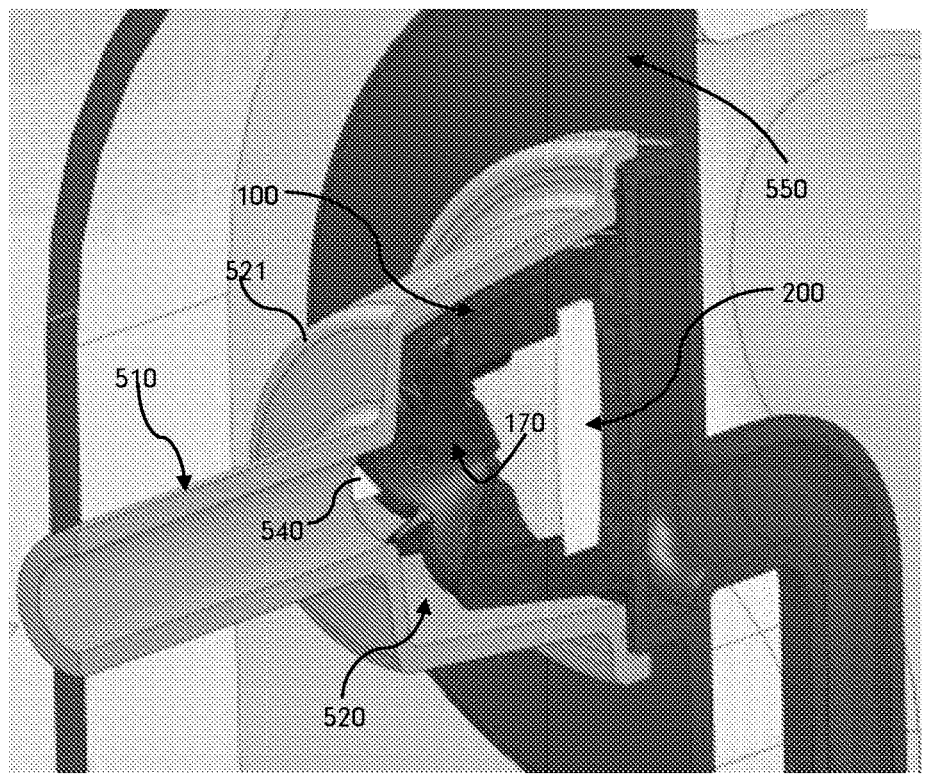
FIG. 5 is a figurative sectional view of the Nespresso™ capsule based beverage system illustrated in FIG. 4 following loading of the cleaning device.

In this illustrative embodiment, cleaning material holding portion 150 is in the form of a quatrefoil shaped recess that forms a tablet holding region 150 in which a tablet 200 consisting of cleaning material may be press fitted into as best shown in FIGS. 4 and 5. Tablet holding region 150 is formed of a quatrefoil shaped wall portion 151 shaped to conform to the external profile of tablet 200 with the tablet 200 being supported internally within insert portion 130 by in this case four inwardly extending equally spaced nibs 152 that form a shelf or seating region upon which the tablet 200 is seated and retained.

In this illustrative embodiment, tablet 200 is of a quatrefoil shape and formed from relevant materials such as one or more of alkaline builders, ionic surfactants, sequestrants, tablet binders and disintegrants as required. In other embodiments, the cleaning material may be formed as a water soluble capsule incorporating cleaning materials contained in a gel-like film. In these embodiments, the cleaning material holding region would be a capsule holding region having a complementary size and shape to receive the cleaning material in capsule form.

Fluid jet forming portion 180 in this embodiment is formed from four spaced orifices 181 arranged in a cross configuration relative to the centre of the depressed wall portion 171 of the inwardly shaped depression that forms reservoir portion 170. As would be appreciated, fluid jet forming portion 180 may be formed of any suitable number of orifices or openings as required depending on requirements. Although in this embodiment, orifices 181 are circular shaped it will be appreciated that other shapes such as slits or other non-regular shapes may be employed to assist in the jet forming action. In other embodiments, fluid jet forming portion 180 may consist of one or more inwardly extending tubes or channels that function as a nozzle to direct the jet of water towards the cleaning material.

Figure 2:
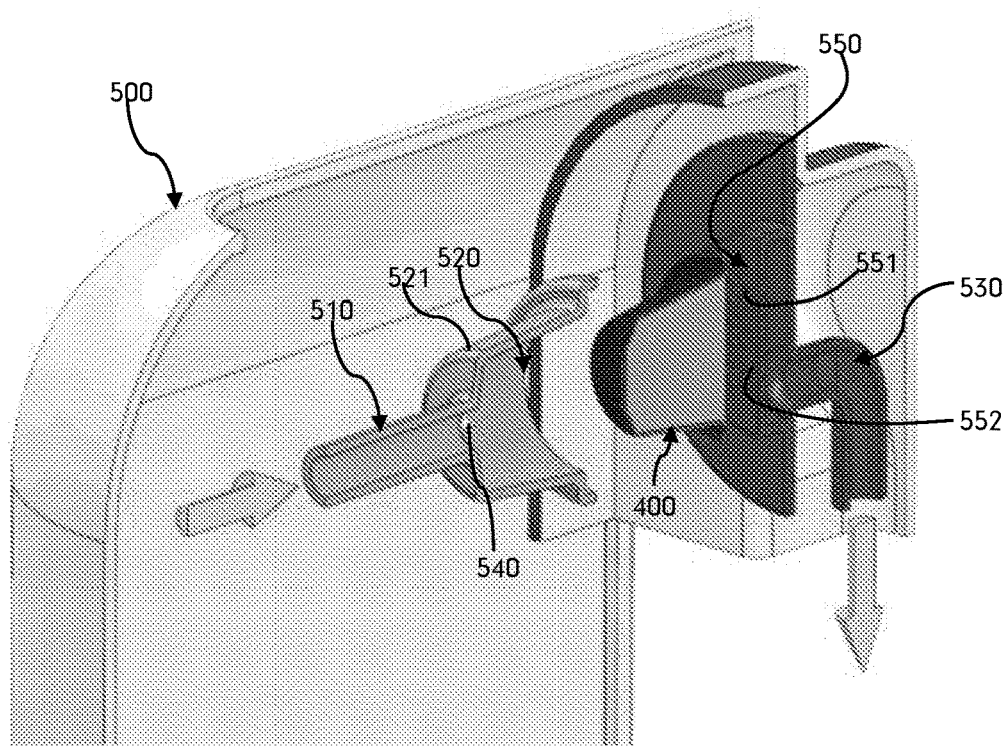
FIG. 2 is a figurative sectional view showing the loading of a Nespresso™ capsule based beverage system with a beverage capsule.
Figure 3:
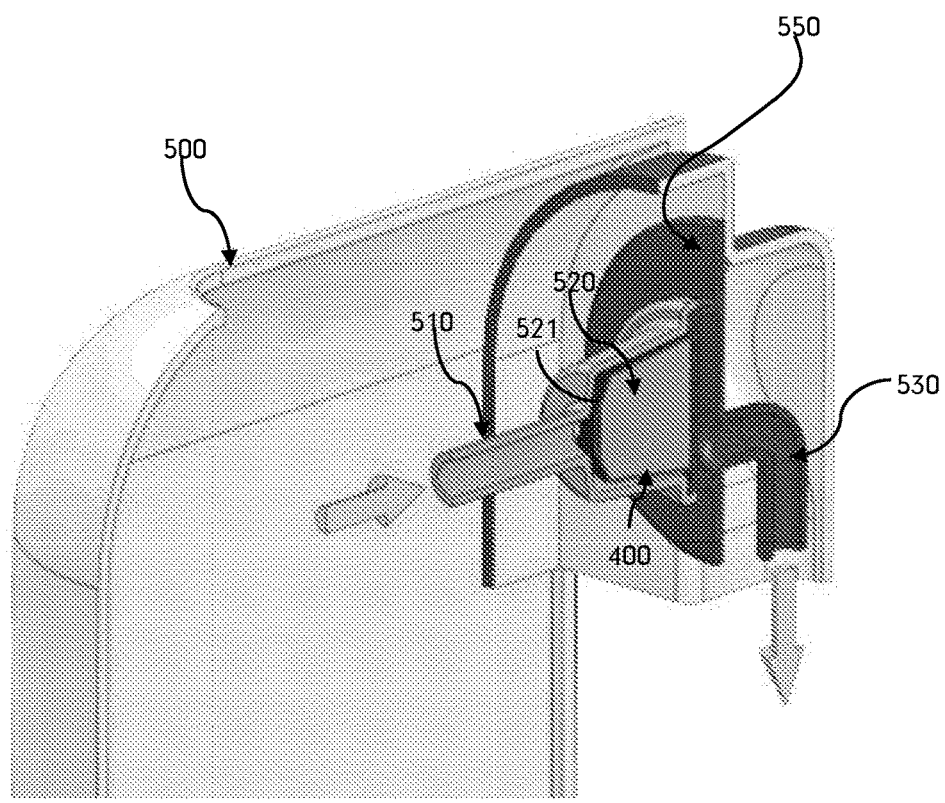
FIG. 3 is a figurative sectional view of the Nespresso™ capsule based beverage system illustrated in FIG. 2 dispensing a beverage from a beverage capsule.

Referring now to FIGS. 2 and 3, it is illustrative to review the operation of a capsule based beverage system 500 which is shown in a sectional figurative view in order to depict the operation of the system. In this example, capsule based beverage system 500 is of the type suitable for use with Nespresso™ type capsules. As would be appreciated, the principles of operation are similar to other capsule based beverage systems. Capsule based beverage system 500 includes an inlet arrangement 510 which delivers hot water to the brewing chamber 520 (as shown by the right extending arrow) and an outlet arrangement 530 through which the beverage is dispensed (as shown by the downwardly extending arrow).

Brewing chamber is configured as a retractable cup 521 having at its base one or more cutting or piercing elements 540 which on insertion of capsule 400 and closing of cup 531 functions to pierce the base of beverage capsule 400 (as best seen in FIG. 3) and press the capsule 400 against screen 550 which comprises a series of regular spaced apertures 551 and inwardly extending piercing elements 552 that function to pierce the foil cap of the capsule 400. In this manner, on closing of retractable cup 531 a sealed brewing chamber 520 is formed consisting of the capsule 400 whose bottom and top regions have been pierced. Hot water under pressure is then introduced via the inlet arrangement 510 of the beverage dispenser 500. This hot water, delivered at typical temperatures of 90° C.-95° C. and pressures ranging from 15 bar-19 bar is forced through capsule 400 as result creating the beverage which is dispensed by outlet arrangement 530.

In other examples of capsule based beverage systems, the cup 531 is stationary and the screen 550 is actuated to move towards the cup 531 to form the brewing chamber 520.

Figure 6:
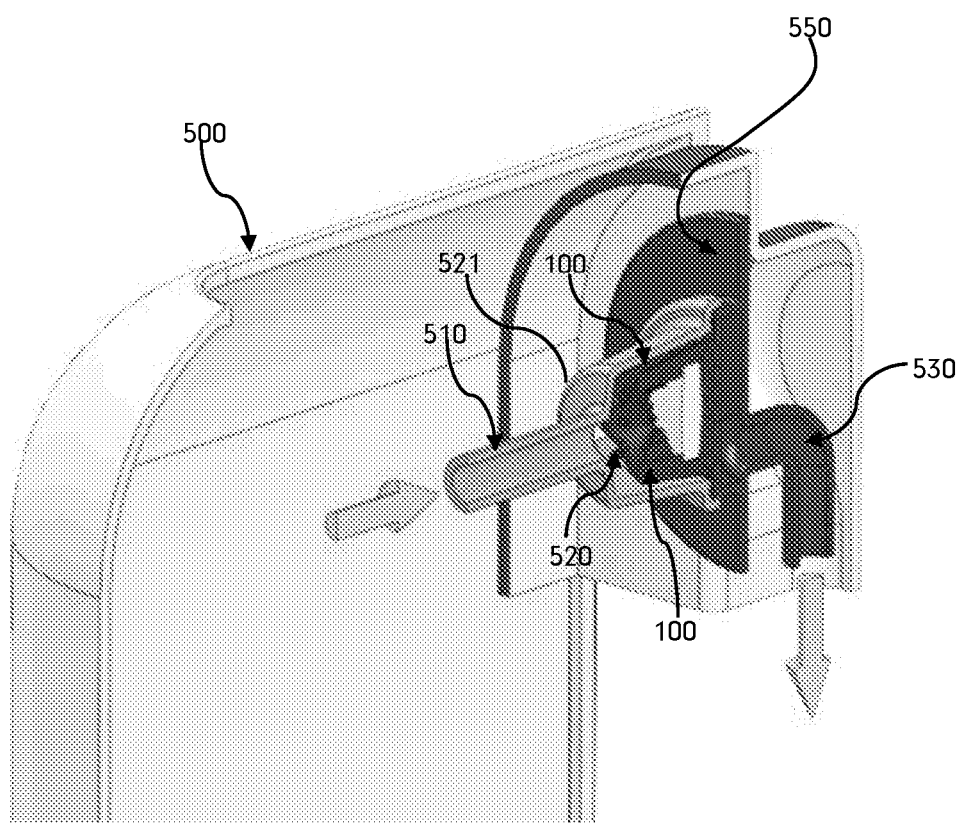
FIG. 6 is a figurative sectional view of the loaded Nespresso™ capsule based beverage system illustrated in FIG. 5 being operated to clean the beverage system.
Figure 7A:
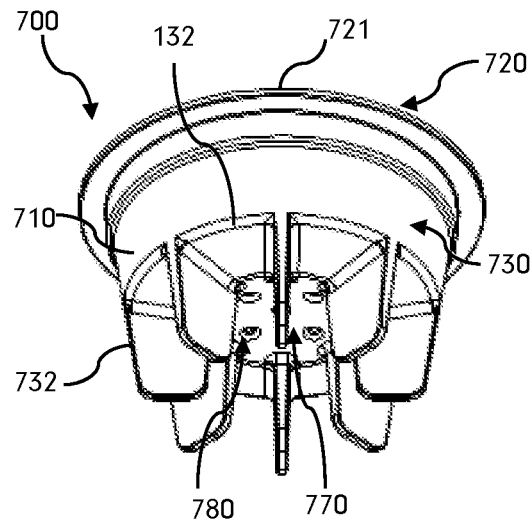
FIGS. 7a to 7f are various views of a cleaning device for Caffitaly™ or K-Fee™ capsule based beverage systems in accordance with an illustrative embodiment.
Figure 7B:
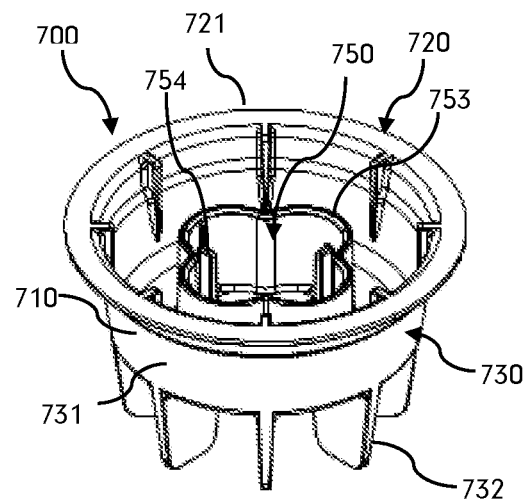
Figure 7C:
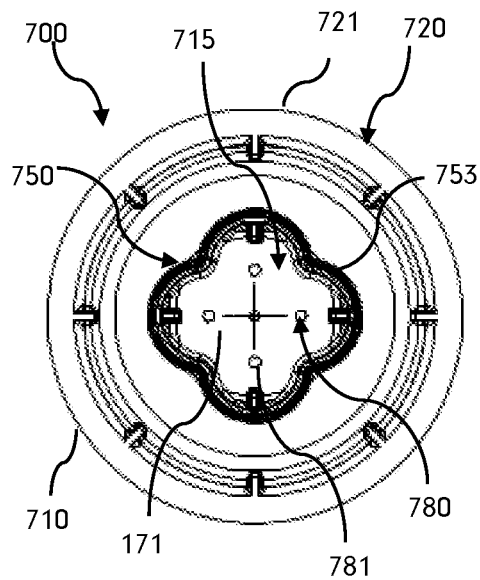
Figure 7D:
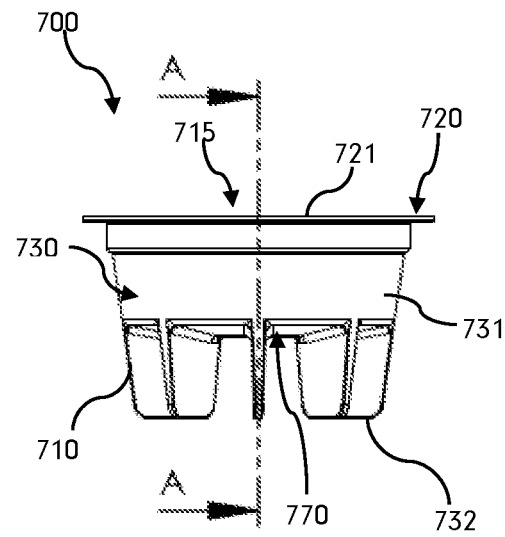
Figure 7E:
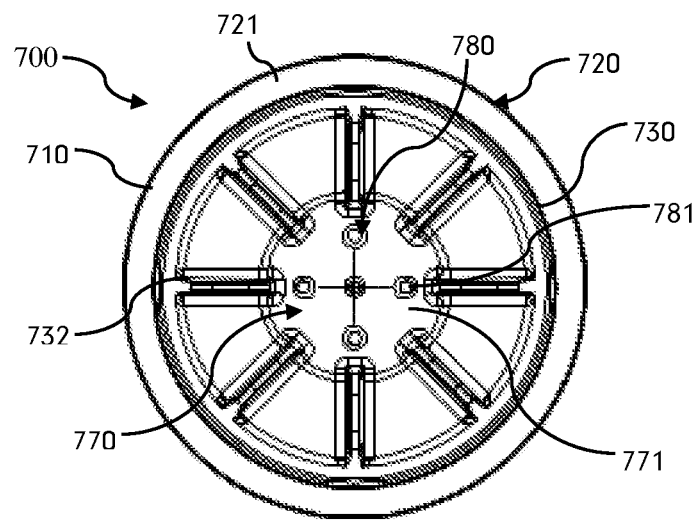
Figure 7F:
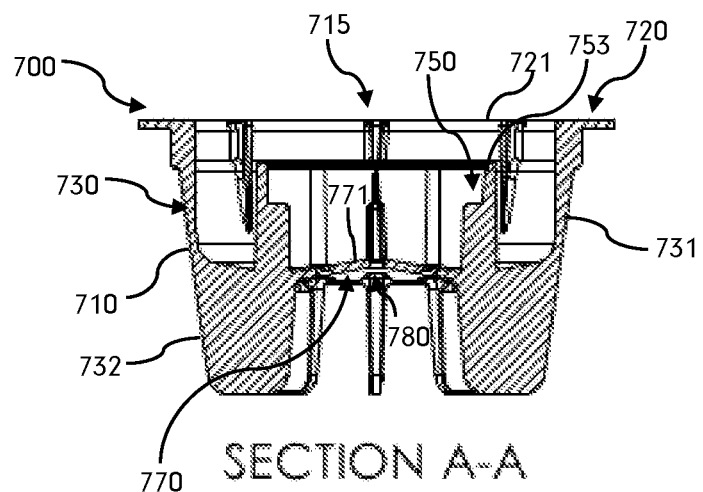

Referring now to FIGS. 4 to 6, in order to clean capsule based beverage system 500, a user would first load cleaning device 100 by, in this example, inserting and press fitting a tablet 200 into the cleaning material holding portion 150 of the cleaning device 100 as shown in FIG. 4. Following loading of the cleaning device 100, it may then be inserted in the brewing chamber 520 as per a standard capsule. The brewing chamber 520 is then sealed by, in this example, closing cup 521 towards screen 550 and the beverage dispenser 500 is operated to fill the brewing chamber 520 with hot water under pressure via the inlet arrangement 510 of the beverage dispenser 500.

This hot water, delivered at typical temperatures of 90° C.-95° C., flows into the reservoir portion 170 of cleaning device 100 where it accumulates and then flows through orifices 181 of the fluid jet forming portion 180 under pressure to form a number of higher pressure water jets which then impinge on the tablet 200 which is being held spaced apart from the tablet holding region 150 of cleaning device 100. This jet action causes the tablet 200 to dissolve and create the cleaning solution that cleans the brewing chamber 520 and outlet arrangement 530.

Cleaning device 100 may then be removed from the brewing chamber 520 similarly to an equivalent used beverage capsule 400. Optionally, a user may elect to additionally flush the brewing chamber 520 by operating the beverage dispenser 500 without a capsule before preparing a beverage.

As would be appreciated, the fluid jets formed by cleaning device 100 assist in ensuring that the cleaning material, in this case tablet 200, fully dissolves which improves the cleaning action due to the cleaning solution being of the correct concentration and further reducing the requirement for flushing any undissolved cleaning solution. Cleaning device 100 may then be re-used as required by simply reloading, in this case by press fitting a tablet 200 into the cleaning device 100, as described above.

In other embodiments, the cleaning device would be purchased or provided preloaded. In other embodiments, the cleaning device would be disposable and incorporate the cleaning material either attached to, or forming part of the body, in a single use form.

Referring now to FIGS. 7a to 7f, there are shown various views of a cleaning device 700 for Caffitaly™ or K-Fee™ capsule based beverage systems. As such, cleaning device 700 is suitable for cleaning the brewing chamber and outlet arrangement of a Caffitaly™ capsule or pod system such as models, including but not limited to, S01HS, S03, S04, S05, S06HS and S14 and variants produced for private labels such as for the American coffee chain Coffee Bean and Tea Leaf as well as K-Fee™ capsule based beverage system such as models including, but not limited to, 580, 583 and 585.

Cleaning device 700 includes a generally circularly shaped open-ended body portion 710 that is configured to be located in the brewing chamber in the same sense that a capsule based beverage capsule would locate in the brewing chamber for making a beverage. Cleaning device further includes a reservoir portion 770 that is located at an opposed end to the open end 715 of body portion 710 and a fluid jet forming portion 780 in fluid communication with the reservoir portion 770. Body portion 710 includes an internally located tablet holding region 750 configured in this embodiment to accept and hold cleaning material in tablet form.

In this illustrative embodiment, body portion 710 includes a locating portion 720 that engages with the brewing chamber of the beverage system to prevent movement of body portion 710 during the cleaning process. Similar to cleaning device 100, locating portion 720 is formed as circular rim or lip 721 extending around the open-end 715 of body portion 710 that seats or locates against the opening of the brewing chamber in a similar manner as the rim of the corresponding beverage capsule would. Body portion 710 further includes an insert portion 730 that extends into the brewing chamber and which generally conforms to the shape of the brewing chamber that it extends into.

In this illustrative embodiment, insert portion 730 is formed as cylindrical wall 731 extending in use into the brewing chamber from locating portion 720 and terminating in a number of radially spaced fins 732 that extend part way to the centre of insert portion 730 surrounding reservoir portion 770 which is formed as an inwardly shaped depression or dimple in the end of insert portion 730. In this manner, the insert portion 730 is formed generally having a tapered cylindrical outer profile of similar size and configuration as compared to an equivalent capsule of the respective capsule based beverage system. Fluid jet forming portion 780 in this embodiment is formed from four spaced orifices or openings 781 arranged in a cross configuration in the wall 771 of the inwardly shaped depression that forms reservoir portion 770.

Tablet holding region 750 is formed with a tablet conforming peripheral wall or skirt portion 753 extending upwardly from the bottom of insert portion 730 to receive the tablet. To facilitate the seating or locating of the cleaning tablet, tablet holding region 750 incorporates four inwardly extending nibs or abutment portions 754 spaced at right angles to each other. As a result, tablet holding region 750 is arranged to be spaced apart from the orifices 780. In this illustrative embodiment, peripheral wall portion 753 is of a quatrefoil shape to receive a corresponding quatrefoil shaped tablet. As would be appreciated, the peripheral wall portion 753 may be sized and shaped to receive any correspondingly shaped tablet.

In operation, in order to clean a capsule based beverage system, a user would first load cleaning device 700 by, in this example, a tablet being press fitted into tablet holding region 750. As referred to above, nibs 754 assist in ensuring that the tablet is spaced apart from the fluid jet forming portion 180. Cleaning device 700 is then inserted in the brewing chamber as per a standard capsule.

The brewing chamber is then sealed in accordance with the standard operating procedure of the beverage dispenser and the beverage dispenser is operated to fill the brewing chamber with hot water under pressure via the inlet arrangement of the beverage dispenser. This hot water, delivered at typical temperatures of 90° C.-95° C. and pressures ranging from 15 bar-19 bar, flows into reservoir portion 770 where it accumulates and then flows through orifices 781 of the fluid jet forming portion 780 under pressure to form a number of higher pressure water jets which then impinge on the tablet 200 which is being held spaced apart from the tablet holding region 750 of cleaning device 700.

As discussed previously, this jet action causes the tablet 200 to dissolve and create the cleaning solution that cleans the brewing chamber 520 and outlet arrangement 530 of the beverage dispensing system.

The cleaning device may then be removed from the brewing chamber similarly to an equivalent used beverage capsule. Optionally, a user may elect to additionally flush the brewing chamber by operating the beverage dispenser without a capsule before preparing a beverage.

While in the above-described embodiments, the cleaning device is formed as a unitary moulding of a suitable food grade plastic such as polypropylene or low density polyethylene, in other embodiments a cleaning device may be formed of a more flexible material such as silicone rubber or the like which may be suitable for more frequent use such as in a hospitality setting.

While in the above-described embodiments, a quatrefoil shaped tablet is employed in other embodiments other shapes such as square, pentagonal, hexagonal, heptagonal, hexagonal etc may be used or alternatively non-regular shaped tablets optimised for the particular cleaning conditions may be adopted.

The thickness of the tablet may be in the range including, but not limited to, 1.5 mm-2.0 mm, 2.0 mm-2.5 mm, 2.5 mm-3.0 mm, 3.0 mm-3.5 mm, 3.5 mm-4.0 mm, 40 mm-4.5 mm, 4.5 mm-5.0 mm, 5.0 mm-5.5 mm, 5.5 mm-6.0 mm, 6.0 mm-6.5 mm, 6.5 mm-7.0 mm, 7.0 mm-7.5 mm, 7.5 mm-8.0 mm, 80 mm-8.5 mm, 85 mm-9.0 mm, 90 mm-9.5 mm and 9.5 mm-10.0 mm.

The outside circumscribed diameter of the tablet may be in the range including, but not limited to, 5 mm-7.5 mm, 7.5 mm-10 mm, 10 mm-12.5 mm, 12.5 mm-15 mm, 15 mm-17.5 mm, 17.5 mm-20 mm, 20 mm-22.5 mm, 22.5 mm-25 mm, 25 mm-27.5 mm, 27.5 mm-30 mm, 30 mm-32.5 mm and 32.5 mm-35 mm.

The volume of cleaning material may be in the range including, but not limited to, 250 $mm^3$-500 $mm^3$, 500 $mm^3$-750 $mm^3$, 750 $mm^3$-1000 $mm^3$, 1000 $mm^3$-1250 $mm^3$, 1250 $mm^3$-1500 $mm^3$, 1500 $mm^3$-1750 $mm^3$, 1750 $mm^3$-2000 $mm^3$, 2000 $mm^3$-2250 $mm^3$, 2250 $mm^3$-2500 $mm^3$, 2500 $mm^3$-2750 $mm^3$ and 2750 $mm^3$-3000 $mm^3$.

In one example, the table has a thickness of 6 mm and a circumscribed diameter or outside perimeter of 20 mm. For a quatrefoil shape such as tablet 200 the resulting volume is 1324 $mm^3$, while for a trefoil shape such as petal 1050, the equivalent volume is 1149 $mm^3$. In this manner, the volume of the cleaning material may be modified by the selection of the tablet shape.

In other embodiments, the shape of the cleaning tablet may signify its strength or type so that a user when requiring a particular type of cleaning operation would select a cleaning device having a tablet holding region having a complementary size and shape to the required tablet.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A cleaning device for cleaning a capsule based beverage system, the capsule based beverage system including a brewing chamber having a predetermined size and shape for receiving a beverage capsule, the brewing chamber including an inlet arrangement operable to introduce water at pressure into the beverage capsule received in the chamber and an outlet arrangement to deliver beverage from the beverage capsule, the cleaning device comprising:
a body portion having an open end and configured to be located in the brewing chamber;
a reservoir portion located at an opposed end to the open end of the body portion;
a fluid jet forming portion in fluid communication with reservoir region; and
a cleaning material holding portion located internally of the body portion for holding the cleaning material spaced apart from the fluid jet forming portion, wherein the cleaning device is configured to allow water under pressure originating from the inlet arrangement to flow into the reservoir portion and to form a fluid jet from the fluid jet forming portion that impinges on cleaning material held in the cleaning material holding portion to create a cleaning solution to clean the brewing chamber and outlet arrangement.

2. The cleaning device of claim 1, wherein the reservoir portion is formed by a depressed wall portion located at the opposed end to the open end of the body portion.

3. The cleaning device of claim 2, wherein the fluid jet forming portion is formed in the depressed wall portion of the reservoir portion.

4. The cleaning device of claim 3, wherein the fluid jet forming portion includes one or more orifices formed in the depressed wall portion, the orifices configured to form a fluid jet from water originating in the reservoir portion.

5. The cleaning device of claim 1, wherein the body portion includes an insert portion and a locating portion, the insert portion extending into the brewing chamber and the locating portion configured to engage with the brewing chamber to prevent movement of the body portion when water under pressure interacts with the cleaning material.

6. The cleaning device of claim 5, wherein the insert portion generally conforms to or with the shape of the brewing chamber.

7. The cleaning device of claim 1, wherein the cleaning material holding portion is configured to allow reloading of the cleaning material holding portion after use.

8. The cleaning device of claim 7, wherein the cleaning material holding portion is a tablet holding region adapted to receive the cleaning material in tablet form.

9. The cleaning device of claim 8, wherein the tablet holding region is configured to hold the tablet by press fitting the tablet into the tablet holding region.

10. The cleaning device of claim 7, wherein the cleaning material holding portion is a capsule holding region adapted to receive the cleaning material in capsule form.

11. The cleaning device of claim 10, wherein the capsule holding region is configured to hold the capsule by press fitting the capsule into the capsule holding region.

12. The cleaning device of claim 1, wherein the body portion and the cleaning material holding portion are integrally formed in a unitary moulding.

13. A method for cleaning a capsule based beverage system, the capsule based beverage system including a brewing chamber having a predetermined size and shape for receiving a beverage capsule, the brewing chamber including an inlet arrangement operable to introduce water at pressure into the beverage capsule received in the chamber and an outlet arrangement to deliver beverage from the beverage capsule, the method including:

inserting a cleaning device configured to be received into the brewing chamber, the cleaning device comprising an open-ended body that holds the cleaning material spaced apart from a fluid jet forming region of the cleaning device;

operating the beverage system to cause water at pressure to enter the brewing chamber by the inlet arrangement to form one or more fluid jets from the fluid jet forming region to impinge on the cleaning material to form a cleaning solution; and operating the beverage system to cause the cleaning solution to be forced out of the outlet arrangement.

14. The method of claim 13, wherein the cleaning device is reusable and further including reloading cleaning material into the cleaning device before inserting the cleaning device into the brewing chamber.

15. The method of claim 14, wherein the cleaning material is in tablet form and reloading includes press fitting the tablet into a tablet holding region of the cleaning device.

16. The method of any claim 13, further including flushing the beverage system by operating the beverage system again following the initial operating of the beverage system to cause the cleaning solution to be forced out of the outlet arrangement prior to preparing a beverage.

* * * * *

UNITED STATES PATENT AND TRADEMARK OFFICE
CERTIFICATE OF CORRECTION

PATENT NO. : 11,013,365 B2  
APPLICATION NO. : 15/773229  
DATED : May 25, 2021  
INVENTOR(S) : Christopher Short et al.

Page 1 of 1

It is certified that error appears in the above-identified patent and that said Letters Patent is hereby corrected as shown below:

In the Claims

Column 10, Line 15, Claim 16, after "of" delete "any"

Signed and Sealed this  
Second Day of November, 2021

Drew Hirshfeld  
*Performing the Functions and Duties of the*  
*Under Secretary of Commerce for Intellectual Property and*  
*Director of the United States Patent and Trademark Office*